(12) United States Patent
Ott et al.

(10) Patent No.: US 9,731,253 B2
(45) Date of Patent: Aug. 15, 2017

(54) STANDPIPE ARRANGEMENT AND FASTENING FOR HOLDING AND FOR SUPPLYING GAS TO AERATORS IN A WASTE WATER CLARIFYING BASIN

(71) Applicant: Alexander Ott, Hannover (DE)

(72) Inventors: Alexander Ott, Hannover (DE); Wilfried Ott, Langenhagen (DE)

(73) Assignee: Alexander Ott, Hannover (DE)

( * ) Notice: Subject to any disclaimer, the term of this patent is extended or adjusted under 35 U.S.C. 154(b) by 318 days.

(21) Appl. No.: 13/715,817

(22) Filed: Dec. 14, 2012

(65) Prior Publication Data

US 2014/0070433 A1    Mar. 13, 2014

(30) Foreign Application Priority Data

Sep. 10, 2012  (DE) .......................... 10 2012 108 400

(51) Int. Cl.
*B01F 3/04* (2006.01)
*C02F 3/20* (2006.01)

(52) U.S. Cl.
CPC .......... *B01F 3/0451* (2013.01); *B01F 3/0412* (2013.01); *B01F 3/04241* (2013.01); *C02F 3/201* (2013.01); *B01F 2003/04177* (2013.01); *B01F 2003/04191* (2013.01); *B01F 2003/04276* (2013.01); *Y02W 10/15* (2015.05)

(58) Field of Classification Search
CPC .......... B01F 3/0451; B01F 2003/04177; B01F 2003/04276; B01F 3/04241; B01F 3/0412; B01F 2003/04191; C02F 3/201; Y02W 10/15

USPC ........................................................... 285/86
See application file for complete search history.

(56) References Cited

U.S. PATENT DOCUMENTS

| 2,487,241 A | 11/1949 | Hilton |
| 3,063,689 A * | 11/1962 | Coppock ............. B01F 3/04269 239/602 |
| 3,768,788 A * | 10/1973 | Candel ................ B01F 3/04262 261/122.1 |
| 3,953,553 A * | 4/1976 | Thayer .................. B01F 3/0412 261/122.1 |
| 3,954,922 A * | 5/1976 | Walker ................ B01F 3/04255 261/121.1 |
| 4,012,470 A | 3/1977 | Thayer |

(Continued)

FOREIGN PATENT DOCUMENTS

| DE | 102012005472 A1 * | 9/2013 | ............. C02F 3/201 |
| DE | 102012009283 A1 * | 11/2013 | ............ B01F 3/0412 |

(Continued)

*Primary Examiner* — Amber R Orlando
*Assistant Examiner* — Stephen Hobson
(74) *Attorney, Agent, or Firm* — Collard & Roe, P.C.

(57) ABSTRACT

There is a standpipe arrangement for holding and for supplying gas to aerators in a clarifying basin. The standpipe arrangement comprises a pipe conduit with holding means for aerators, with gas openings to the aerators and with means of fastening the pipe conduit on the base of the clarifying basin. The pipe conduit comprises several support pipes connected to each other, at the connection points of which fastening means are arranged. By way of the fastening means the support pipes are fixed both at a distance above the base of the clarifying basin as well as laterally and against rotation about the pipe axis, but can be moved along the pipe axis.

16 Claims, 8 Drawing Sheets

(56) References Cited

U.S. PATENT DOCUMENTS

| | | | | |
|---|---|---|---|---|
| 4,076,285 A * | 2/1978 | Martinez | ............... | F16L 37/252 285/332 |
| 4,960,546 A * | 10/1990 | Tharp | ............... | B01F 3/0412 261/122.1 |
| 5,013,493 A * | 5/1991 | Tharp | ............... | B01F 3/0412 210/220 |
| 5,032,325 A * | 7/1991 | Tharp | ............... | B01F 3/04262 261/124 |
| 5,378,355 A * | 1/1995 | Winkler | ............... | C02F 3/20 134/171 |
| 5,714,062 A * | 2/1998 | Winkler | ............... | B01F 3/0412 210/220 |
| 5,851,447 A * | 12/1998 | Tyer | ............... | B01F 3/04241 261/122.1 |
| 5,868,972 A * | 2/1999 | Galich | ............... | F24F 13/0209 261/122.1 |
| 6,811,148 B2 * | 11/2004 | Frankel | ............... | B01F 3/0412 261/122.1 |
| 8,002,249 B2 | 8/2011 | Casper et al. | | |
| 8,602,395 B2 * | 12/2013 | Doppler | ............... | B01F 3/04269 261/122.2 |
| 2004/0188339 A1 * | 9/2004 | Murkute | ............... | B01D 61/18 210/321.8 |
| 2008/0251954 A1 * | 10/2008 | Casper | ............... | B01F 3/0412 261/122.1 |
| 2011/0248414 A1 * | 10/2011 | Reilly | ............... | B01F 3/04269 261/122.1 |
| 2014/0116561 A1 * | 5/2014 | Krall | ............... | F16L 39/04 138/114 |

FOREIGN PATENT DOCUMENTS

| | | |
|---|---|---|
| FR | 2620510 | 3/1989 |
| GB | 1 582 914 | 1/1981 |
| WO | WO2006/063538 | 6/2006 |

* cited by examiner

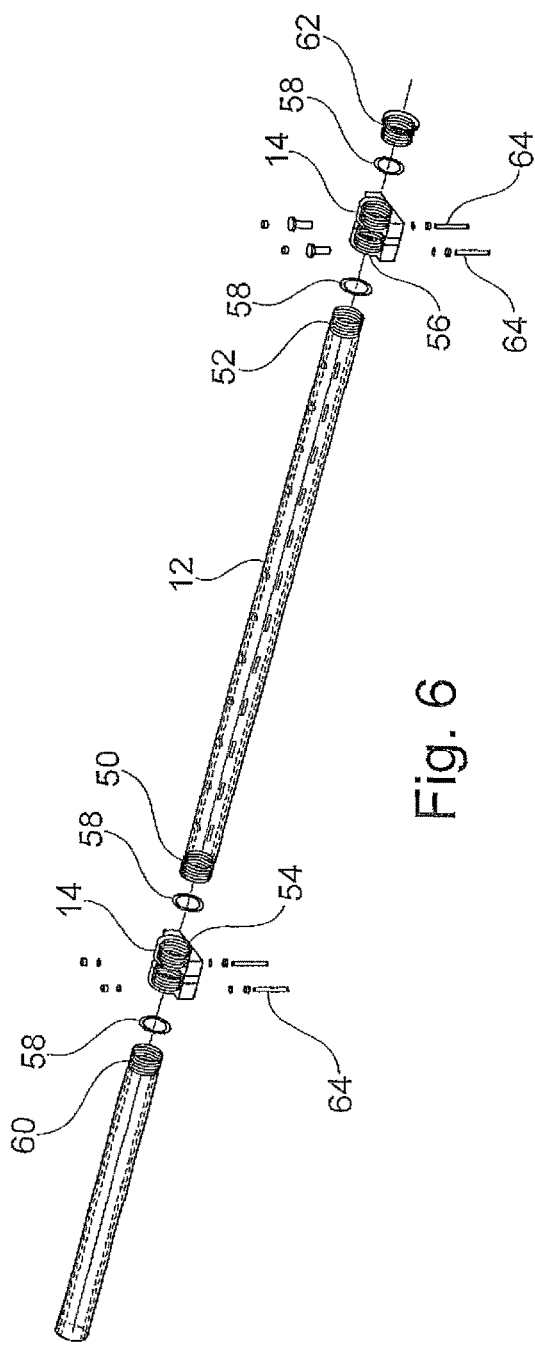
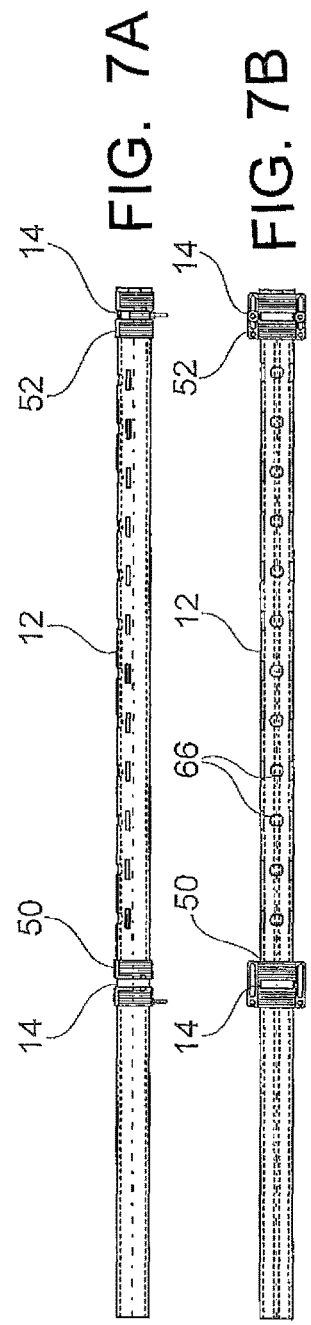

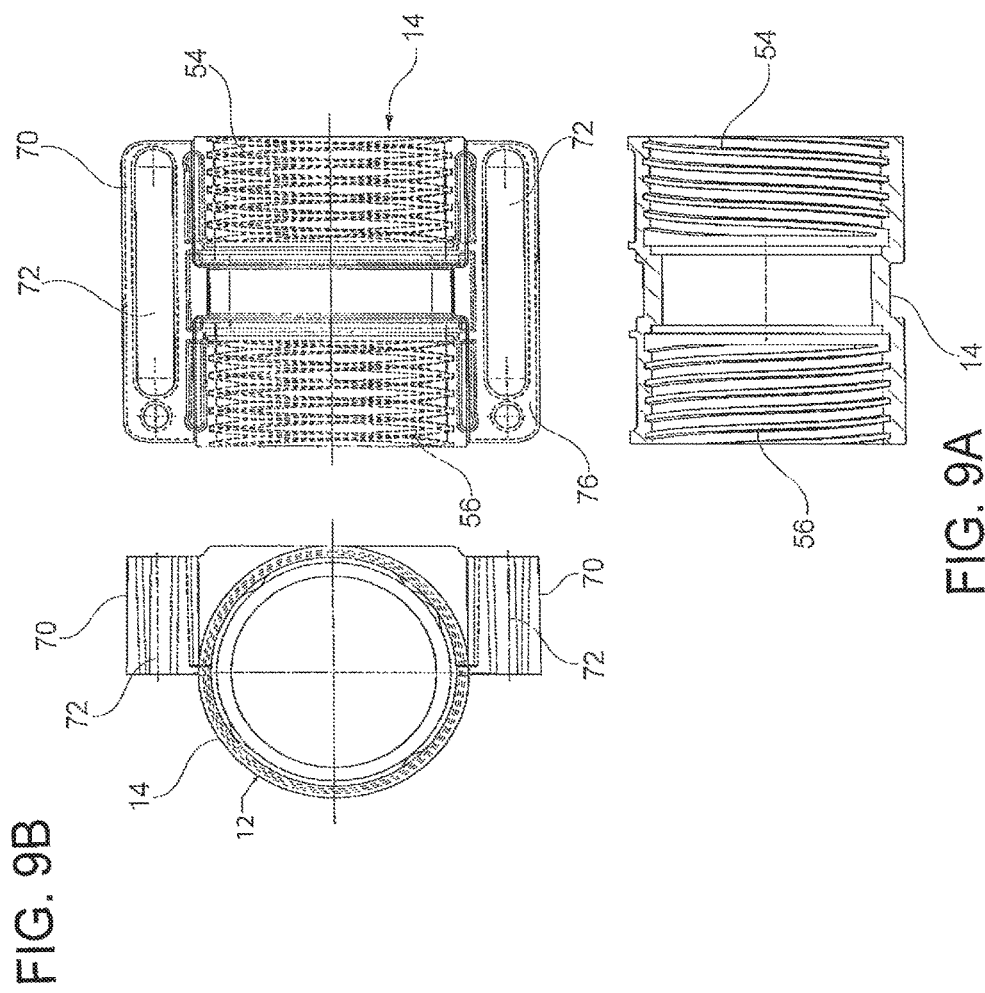

STANDPIPE ARRANGEMENT AND FASTENING FOR HOLDING AND FOR SUPPLYING GAS TO AERATORS IN A WASTE WATER CLARIFYING BASIN

CROSS REFERENCE TO RELATED APPLICATIONS

This application hereby claims priority under 35 U.S.C. 119 from DE102012108400.9 filed on Sep. 10, 2012, the disclosure of which is hereby incorporated herein by reference.

BACKGROUND

At least one embodiment of the invention relates to a standpipe arrangement and fastening for holding and for supplying gas to aerators in a waste water clarifying basin.

Normally aerators in a waste water clarifying basin are arranged on the edge of the basin, as the introduced gas rises upwards, and only through arranging the aerators on the edge of the basin is it ensured that all layers of the waste water are supplied with gas. As a rule, mechanical stirring mechanisms are also built into the basin, which bring about additional mixing of the waste water.

When arranging the aerators in the basin as flat a configuration as possible should be aimed for. This ensures that all areas in the basin are evenly supplied with air. Depending on the basin configuration an aeration system is efficient to a greater or lesser extent.

As the aerators have a defined and standard opening pressure, with a view to efficient and uniform aeration of the waste water it is also necessary to install the aerators at a uniform height level. Otherwise aerators in a higher position would aerate better than those in a lower position due to the low counter-pressure of the smaller water column, so that the uniform and planar aeration of the waste water would be disrupted, resulting in a loss of efficiency.

Fastening of the aerators on the base of the basin is necessary to stop the aerators floating upwards and so that their position is not changed through flows such as those produced by the stirring mechanisms and also by the introduced air. Usually the aerators are mounted on, and supplied with gas via distributor pipes made of stainless steel or plastic. The distributor structures are connected to each other by means of screw, adhesive or welded connections and fastened to the base of the basin with separate elements.

A pipe conduit of a conventional standpipe arrangement thus comprises several elements. By assembling these different elements with each other various pipeline lengths can be produced.

In order to fasten the aerators to the pipe conduit they are inserted into holes. Generally the aerators are attached perpendicularly to the pipes and are located either on the pipes or are attached laterally.

In order to be able to install all the aerators on one level, the pipe conduits are fixed to the base of the basin so that levelling both in the horizontal and vertical axis is possible. For this, in the case of stainless steel pipes, brackets are welded onto the pipe at defined intervals. These brackets are provided with a hole through which is passed a threaded anchor inserted in the base of the basin. By way of nuts provided above and below the brackets the pipe structure can be positioned at the required height.

When using plastic pipe conduits, a firm connection of the pipes to the base of the basin can only be achieved in a costly and laborious manner. This is because depending on the water depth, water temperature, air temperature and course of the pipes, more or less hot air is introduced via the pipe conduits into the aerators, as a result of which expansion or contraction of the pipes due to the thermal properties of the plastics takes place.

Fixing of the pipes to the base of the basin by means of brackets or similar measures which do not allow longitudinal expansion would not therefore be possible.

Nonetheless the pipe conduits must be secured against buoyancy and flow-induced movements, and levelling as described above must be permitted.

To attach the plastic pipe conduit to the base of the basin mechanically complex fastening clips are therefore usually provided. These surround the pipe conduit with a defined clamping force and thereby permit expansion of the pipes in the longitudinal direction. The pipe can move longitudinally within the clip as the clamping force is defined so that movement of the pipe conduit in the longitudinal direction is possible.

However, the use of these clips considerably restricts configuring the basin with aerators, as no aerators can be arranged in the clip areas and depending on the expected longitudinal expansion, a gap must be maintained between the fastening and aerator so that expansion of the pipe conduit is not hindered by the aerator mounted on or at the pipe conduits. A significant loss of efficiency is caused by these interruptions in the configuration.

To achieve the necessary height levelling, the fastening clips are designed so that they can be elevated by way of a foot structure. For this, a plate in which holes are made is normally attached to the lower end of the clip. By way of these holes, the structure is firmly connected to threaded anchors inserted in the base. Via the thread, levelling takes place with nuts which are then screwed against each other to fix the height of the pipes.

In the case of stainless steel pipes, several pipe conduits are usually connected to each other by welding. Where welding is not possible the pipe conduits are connected to each other via couplings by means of flanges or other screw and clamp connections. In both cases, the joining of two pipe conduits to one another constitutes at least one additional working step.

Particularly in the case of welding, additional refinishing work also has to be performed on the connection seam again as the welding seam must be separately pickled in order to prevent corrosion.

Although the refinishing work is omitted in the case of coupled connections, assembly is critical, as well as being laborious and risky in terms of correct attachment of the coupling, as incorrect positioning of a clip would result in leakages.

When using plastic pipes several pipe conduits are connected to each other by means of adhesion, welding or coupling.

In the case of welding, hot-tool welding is used, whereby the ends of the pipe conduits to be connected are softened through the use of heat so that on connecting the sections interfusion of the materials occurs.

However, the adhesion and welding of plastic material is technically complex and also only possible under certain general conditions. Both methods can only be used within a limited temperature range. Here, both the ambient temperature and the temperature of the material are of relevance. Particularly, in view of the fact that the adhesion and welding work is performed in the waste water basin, additional demands are made on the processing. For example, separate basin covers have to be provided so that no moisture reaches the point on which the work is to be carried out, or the basins have to be thoroughly cleaned before assembly.

When using plastic pipes, an adhesive or welded connection is also a weak point due to the low impact resistance and tensile strength of the plastic. Especially so as the aerators are applied perpendicularly to the pipe conduit and as a result of this the flow energy is increasingly introduced into the support pipes via the aerators. The occurring oscillation and bending forces can be so great that the pipe conduit is torn open or the adhesive or weld connection between the pipe conduits is destroyed.

In addition to the restricted temperature range, adhesive and welded connections have the drawback that further processing is only possible after a certain hardening time. If the further processing, for instance in the form of mounting the aerators, occurs before the connection points have completely hardened, the setting process is disrupted by the movement of the aerator and the parts cannot be durably and securely connected.

Through this technical condition assembly is on the one hand retarded and interrupted, and on the other hand the risk of assembly errors due to not observing the hardening specifications is considerably increased.

Over and beyond this feature, an adhesive connection has the disadvantage that the adhesive is exposed to water and can be degraded. Furthermore, the high air temperatures cause the adhesive to soften so that the connection is loosened.

In addition, there are plastic materials which cannot be durably adhered to one another and/or adhesives have to be used which both damage the environment and are harmful to health.

To prevent damage to the pipe conduit caused by vibrations and other forces introduced into the pipeline via the aerators, large wall thicknesses as well as more solid type of connection are used. However, using more solid materials simultaneously influences the expansion of the pipe conduits. This is because a thick-walled pipe expands more so that additional measures have to be taken. Moreover, the use of more solid pipes is expensive and makes processing more difficult.

Coupling of the plastic pipes is certainly technically possible, but poses a problem against the background of thermal expansion. The couplings are not always obtainable in exactly the same material that the pipes are made of. As a result, due to the different expansion coefficients of the material, differences in expansion occur so that leaks can occur in the region of the connection point.

In addition to the problems relating to the connection of plastic pipe conduits, with every type of connection the provision of the basin with aerator elements is interrupted, as in the area of the connection no drilled holes to hold the aerators can be produced so that when using plastic pipe conduits there is an interruption in at least two points per pipe conduit, resulting in a considerable loss of efficiency and performance.

Another problem is securing the pipe conduits against rotary movements initiated by the aerators. The fastening clips applied to secure the pipe conduits against buoyancy on the base of the basin and which only surround the pipe conduits but are not firmly connected to them, cannot absorb torsion forces. As a consequence, all the kinetic energy introduced into the pipe by way of the aerators is taken up by the connection elements. Due to the relatively low strength of plastic materials and against the background that the connections are only adhesive or welded connections in places, the fact that the connection elements have to absorb the high torsion force constitutes a considerable operational risk. In many applications damage to the pipeline system occurs because of this problem.

In addition, the force introduced by the up and down movements of the ends of the aerators can lead to destruction of the connection point between the aerator and the pipe conduit, whereby the aerators really tear open the pipe conduits. This is because due to the acting forces the already relatively weak plastic material is further weakened by the holes produced in the area in which the aerators are applied.

The application of the aerators on the pipe conduits also leads to a general weakening of the material. The pressure acting on the support pipes through fastening the aerators thereon causes the plastic material to flow; it effectively evades the pressure whereby not only is the wall thickness in the area of the fastening reduced, but flowing of the material brings about a change in the external diameter of the pipe which results in a reduction in the clamping force which is necessary for the aerator to be firmly attached on or to the pipe conduit. This leads to leakages or even loosening of the aerators.

In addition to this, the no longer firm attachment of the aerators to or on the pipe conduit can lead to increased vibration of the aerators as a result of which the support pipe is weakened further in the area of the fastening.

SUMMARY

One goal of one embodiment of the invention is to improve a standpipe arrangement made of plastic so that fastening to the base of the basin is simplified, unhindered longitudinal expansion is made possible and the aerators can be securely and firmly fastened to the support pipe.

Thus, one embodiment of the invention relates to a standpipe arrangement for holding and for supplying gas from aerators in a clarifying basin comprising a pipe conduit with holding means for aerators. This pipe conduit can have gas openings to the aerators and with means for fastening the pipe conduit on the base of the clarifying basin. The pipe conduit can comprise a plurality of support pipes connected to each other, at the connection points of which the fastening means are arranged, movable along the pipe axis and wherein these fastening means are configured to fix the support pipes at a distance over the base of the clarifying basin and to fix these pipes laterally as well against rotation about the pipe axis.

Through future measures, connection of the pipe conduits to each other and securing against buoyancy of the pipe conduits are to be achieved by just one element and any auxiliary material can be dispensed with when fastening and/or connecting the components with each other.

In the standpipe arrangement in accordance with at least one embodiment of the invention, fastening by means of separate fastening clips which surround the pipes and secure them against buoyancy becomes unnecessary as the task of the clips is simultaneously assumed by the pipe connection. Only anchoring bolts inserted into the base of the basis are still required.

However, the invention is not solely limited to the integration of the fastening of the pipe conduits on the base of basin and the actual connection of the pipe conduits, but by way of the fastening means it is also achieved that the support pipes can move axially in relation to the stationary anchoring bolts and the pipe conduit is thus positioned in a floating manner, but at the same time the connection is secured against rotation about the longitudinal axis and can therefore absorb the torsion forces introduced into the support pipe by the aerators without any problems.

With this type of fastening the pipe conduit can also expand and contract without hindrance under the effect of changing temperatures.

In accordance with a further development of a first embodiment the fastening means of the support pipes each have a nipple at one end and a sleeve at the other end and the nipple of one support pipe engages in the sleeves of a neighbouring support pipe. On the outside of each nipple and each sleeve the fastening means have attachments arranged in pairs opposite each other, which after a rotary action has been performed form an axial positively locking fit between adjacent support pipes. Both the projection on the nipple and the attachments on the sleeve engage in a support fitting fastened to base of the clarifying basins as a further component of the fastening means via a tongue and groove connection, wherein the groove and tongue extend in the axial direction and engage in the radial direction.

The sleeve can be produced in that at one end, the support pipes are widened and at defined points on this end attachments are applied. The other ends of the support pipes are unchanged or are of smaller diameter so that they can be pushed into the widened ends of another equivalent support pipe. The ends of the support pipes with unchanged or smaller diameters also have attachments. The pipe ends of unchanged or smaller diameter also have one or more recesses for seals.

The attachments applied to the support pipes are designed in such a way that on the one hand they can absorb the torsion forces introduced by the aerators, but on the other hand the support pipes cannot be pulled apart through movements in the longitudinal direction. The attachments are dimensioned so that their configuration constitutes an optimum between shear resistance and material use.

In addition, grooves or tongues can be applied on the outside of the attachments as part of a tongue and groove connection for stopping and guiding in the longitudinal direction.

The attachments at the ends of the support pipes are also designed so that through joining the support pipes and then rotating them with regard to each other, interlocking of the support pipes is achieved so that they can only be pulled apart by rotation in the opposite direction, i.e. after loosening of the interlocking.

For this, at one pipe end the attachments are each provided with an attachment with a stud at its forward end. The studs of the attachments opposite each other in relation to the pipe axis point in opposite directions.

Accordingly, the attachments at the other ends of the pipes do not have a projection, but have a recess in the shape of the stud applied to the projection.

To connect the support pipes they are pushed into one another. The end of the support pipe which is smaller in diameter penetrates so far into the end with the larger diameter that the ends of the attachments applied to each of the end of the pipe are on one level.

The support pipes are now turned with regard to each other so that the two projections on the attachments are inserted into the recesses of the other attachments.

To fasten the pipe conduits to the base of the basin they are pushed into a support fitting tray which is provided for this purpose and attached to the base of the basin, thereby securing the pipe conduits against buoyancy.

The support fitting is designed so that levelling of the pipe conduit is possible. At the same time the pipe conduits are held in such a way that they are secured against rotation, though expansion in the longitudinal direction is possible at all times.

In conjunction with the attachments applied to the support pipes, the purpose of this support fitting is also to ensure that the loosening of the connection is only possible when the pipes are removed from the support fitting, which is not possible during operation.

To meet these requirements two elongated faces are applied opposite each other on the support fitting in such a way that through pushing in the joined support pipes the attachments are guided between the faces.

The support fitting is also designed so that the attachments rest on it. The pipe conduits can therefore no longer be moved to the left or right about the longitudinal axis and as the attachments both rest on the support fitting, in conjunction with the lateral guide faces rotation is also not possible.

As rotation is thus no longer possible, the pipe conduit is on the one hand secured against turning about the longitudinal axis induced by the aerators and on the other hand the connection of the support pipes to each other is firm and can only be undone by releasing the pipe conduits from the support fitting.

The lateral faces are dimensioned so that the support pipes can contract as well as expand without the attachments applied to the support pipes being able to slide out of the guide or jamming taking place.

For the buoyancy-resistant fastening of the holding structure on the base of the basin holes are provided in the latter, via which the entire structure can be fastened by means of threaded anchors inserted into the base of the basin.

The entire pipe conduit is then also leveled by way of these threaded anchors.

Tightness is achieved by means of seals introduced in the area of the connection between the outer edge of the smaller pipe end and the inner edge of the larger pipe end.

These seals are inserted into grooves provided for them so that they cannot be displaced when the pipes are pushed into each other.

Through the use of only one part for connecting the support pipes to each other, for securing the support pipes against rotation about the longitudinal axis as well as to assure longitudinal expansion and contraction of the pipes, not only is assembly greatly simplified, but at the same time there is not so much interruption in the configuration of the basin with aerators. As a result of this, an aeration system of this type is considerably more efficient than a conventional one made of plastic.

As adhesion or welding at the connection is no longer necessary due to the design of the attachments on the support pipe and the design of the holding structure, the processing and installation risk is considerably reduced.

In accordance with a further development of a second embodiment the fasting means comprise pipe connectors and these pipe connectors are used to fasten the pipe conduit to the base of the clarifying basin. For this the pipe connectors have lateral attachments with axially extending elongated holes through which fastening bolts anchored in the base of the clarifying basin pass when in the assembled state, and the fastening bolts at least above the attachments on the pipe connect and at a small distance from the upper side of the attachments, have stops so that even in the assembled state the pipe connectors can be moved axially relative to the fastening bolts.

In this embodiment, fastening with separate clips is unnecessary as the task of the clips is simultaneously assumed by the pipe connectors. Only anchoring bolts are still required. In the solution according to one embodiment of the invention the attachments with penetrating bolts which are usual in the case of clips are an integral part of the pipe connectors and are produced together with them in one working step.

However, the invention is not solely restricted to the integration of the clips in the pipe connectors, but through arranging elongated holes in the attachments it is simultaneously achieved that the pipe connectors can move axially with regard to the stationary anchoring bolts and the pipe conduit is thus positioned in a floating manner. Due to this floating positioning, the pipe conduit can undergo unhindered expansion and contraction in the axial direction under the influence of changing temperatures as can occur through the effect of the weather and biological activities.

Preferably spacer sleeves are arranged on the fastening bolts which are slightly longer than the height of the attachments on the pipe connector.

Mechanically this ensures that the pipe connectors supported by means of the fasting bolts and screws cannot be jammed fast. However the spacer sleeves are designed so that between the spacer sleeve and pipe connector, interlocking takes place in the form of circular toothed section which is designed in such a way that on the one hand the pipe conduit is secured against longitudinal movements which occur through the introduced rotary movements of the aerators and/or by currents in the basins, but on the other hand longitudinal expansion induced by contraction or expansion of the pipe is possible.

The height of the attachments is approximately half the outer diameter of the pipe connector.

The dimension represents an optimum between mechanical stability against the shearing off of the pipe-shaped part of the pipe connector and material use.

In a preferred embodiment, in the assembled state, the attachments extend from a lower horizontal tangent on the pipe connectors to half the height of the pipe connectors.

In this embodiment the fastening bolts could manage with just one upper stop for the floating support of the pipe connector. A lower stop would be automatically provided by the base of the basin. However, it is also possible to provide the fastening bolt with a lower stop as is otherwise usual.

In accordance with a further development, the support pipes and pipe connectors have opposing threads at their relevant ends.

Unlike in an adhesive or welded connection, the forces introduced by the aerators cannot lead to destruction of the connection. Also any number of support pipes and pipe connectors can be assembled and removed without disassembling an entire pipe conduit. Turning the support pipe or pipe connector about its axis screws or unscrews both ends at the same time. The remaining pipe conduit only has to be axially displaceable, which is, however, ensured through the measures described above.

In addition, this type of connection is technically much more efficient as welded and adhesive connection are very complex and can only be used within a restricted temperature range. In the case of welding and adhesion, the ambient temperature is restricted anyway and adhesive connections are on the one hand not possible in the long term with certain plastics, and on the other hand adhesive loosens at higher temperatures. Over and beyond these assembly risks, these types of connections must always be produced extremely meticulously, which can only be achieved in a very costly manner on a building site.

It is also envisaged that gas permeation openings to the aerators are only arranged in the support pipes of the pipe conduit, are oval in shape, and with their longer inner diameters are aligned perpendicularly to the longitudinal axis of the support pipes which thereby secures the aerators against rotation perpendicularly to the longitudinal axis of the support pipes.

This means that the support surface of the aerators on the pipe is greater than in the case of round holes, whereby a secure fit of the aerators at or on the pipes can be guaranteed.

Oval-shaped holes also ensure that aerators applied on top of the support pipes, in particular, cannot turn about their screw connection so that the connection between the aerator and pipe is again strengthened.

As the pipe connections do not therefore carry any aerators, the fastening bolts are always freely accessible. However, the aerators are necessarily arranged on the support pipes and positively secured against rotation. Through material accumulation, the wall sections of the support pipes adjoining the gas openings can be thicker than the remaining wall sections.

As a result of this, the forces introduced by the aerators can be better absorbed by the support pipes. In addition the fastening means can be tightened more firmly without the risk of damaging the support pipes and also the material is not as strongly weakened through flowing due to the tightening pressure.

In accordance with a further development, on both sides, next to the gas openings at their same axial position, ribs can be arranged on which fastening bases of assembled aerators are supported and thus secure the aerators against rotating about the longitudinal axis of the support pipes.

The ribs also improve the stability of the pipe. The pipe becomes more rigid, allowing pipes with a smaller wall thickness to be used. Furthermore, oscillation of the aerators about the longitudinal axis of the pipes is prevented, as can occur particularly in the case of aerators applied on the top of the pipes. As the aerators are supported on the ribs, the actual fastening and clamping point is relieved and the pipes can no longer be torn open through movement of the aerators.

Every type of connection in the original or further developed form is technically considerably more efficient in each case as welded and adhesive connections are very costly and can only be used in a limited temperature range and only in suitable weather conditions. The ambient temperature is always restricted in welding and adhesion, and adhesive connections are on the one hand not possible with certain plastics and on the other hand the adhesive loosens at higher temperatures. Over and beyond these assembly risks, these types of connections must always be produced extremely meticulously, which can only be achieved in a very costly manner on a building site.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 6 shows an exploded view of a standpipe arrangement comprising support pipes and pipe connectors in accordance with a second embodiment of the standpipe arrangement;

FIG. 7A is a side view of a second embodiment of a standpipe arrangement;

FIG. 7B is a side cross-sectional view of a second embodiment of the standpipe arrangement;

FIG. 7C is an end view of the second embodiment of the standpipe arrangement;

FIG. 9A is a side view of a pipe connector in accordance with second embodiment of the standpipe arrangement;

FIG. 9B is an end view of the pipe connector;

FIG. 9C is a cross-sectional view of the pipe connector of FIG. 9B;

FIG. 10A shows a side perspective views of a pipe connector in accordance with a second embodiment of the standpipe arrangement; and FIG. 10B is an opposite perspective view of a pipe connector shown in FIG. 10A.

DETAILED DESCRIPTION

Figure 1:
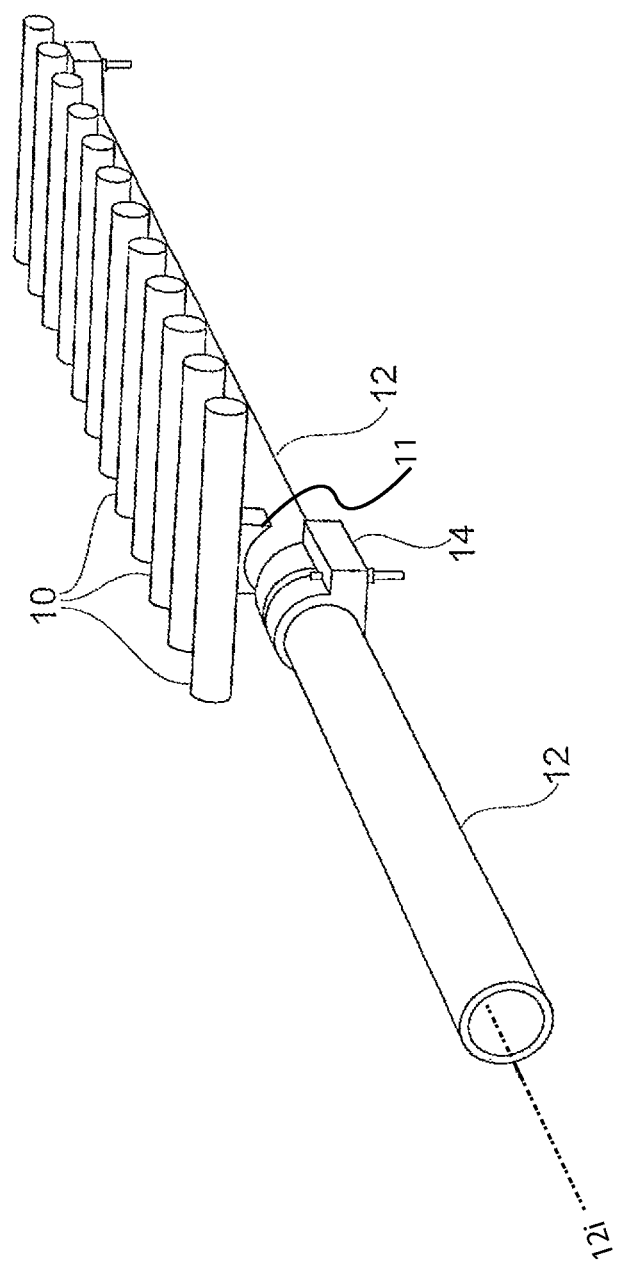
FIG. 1 shows a perspective view of a standpipe arrangement in accordance with a second embodiment with assembled aerators.

FIG. 1 shows a perspective view of a standpipe arrangement in accordance with a second embodiment with aerators 10 assembled on one of the support pipes 12. Shown here are two support pipes 12 and two pipe connectors 14 forming support pipe connectors of a pipe conduit. As can be seen from the illustration, aerators 10 are only arranged on the support pipe 12. In contrast, the pipe connectors 14 have no aerators disposed on them. The support pipes 12 are each approximately 2 m (meters) long along their longitudinal axis 12i, and the pipe connectors are each 14 cm (centimeters) long. Depending on the diameter of the clarifying basin, standpipe arrangements can thus be individually produced by combining the length of the necessary support pipes 12 and pipe connectors 14 in 2.14 m stages. Fastening on the base of the basin takes place exclusively by means of the pipe connectors 14, each at intervals of 2.14 m. Aerators 10 are coupled to support pipes 12 via at least one fastening base 11.

Figure 2:
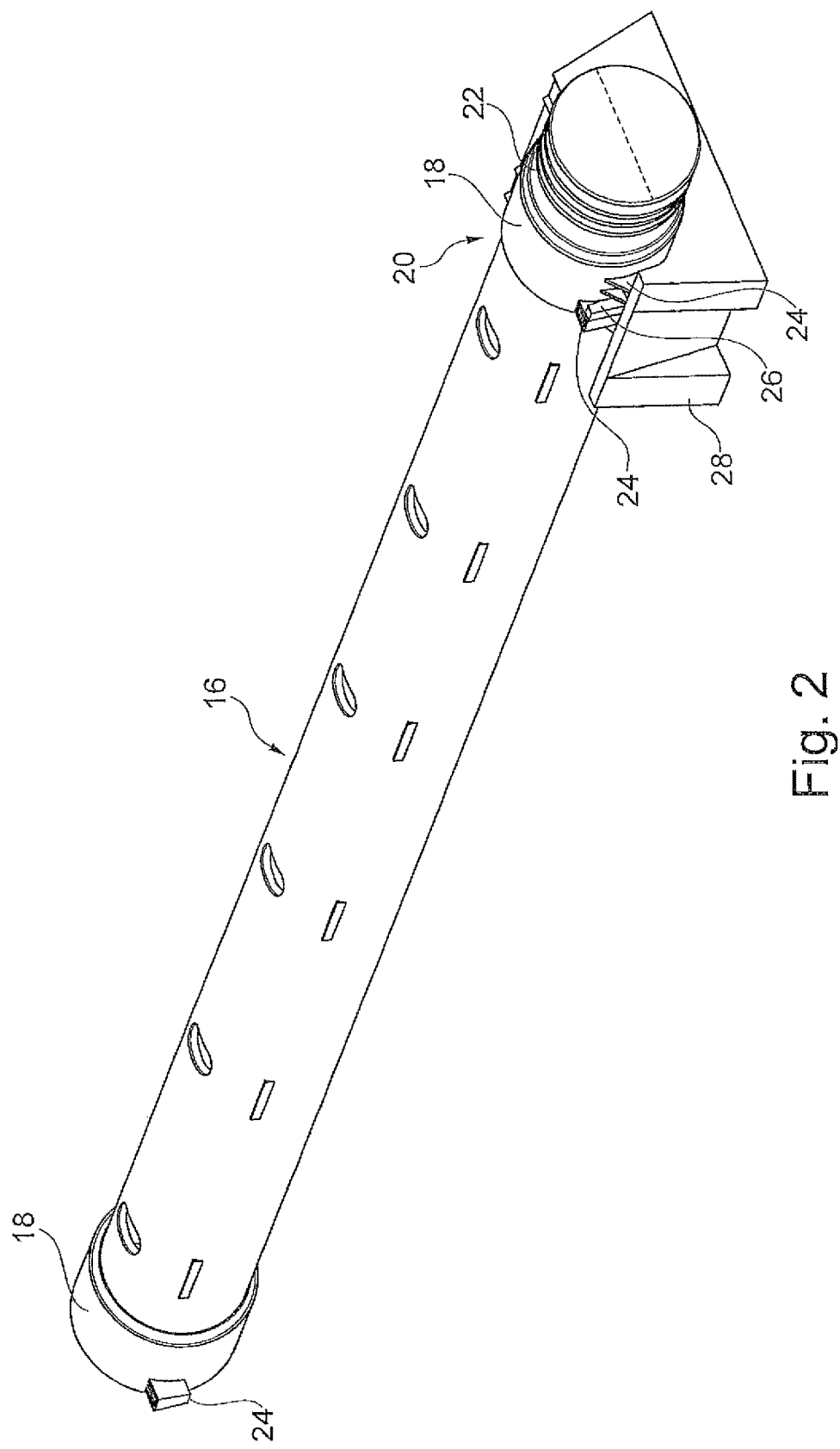
FIG. 2 shows a perspective view of a standpipe arrangement of a first embodiment comprising a support pipe and a closure section on a support fitting.

FIG. 2 shows a perspective view of a standpipe arrangement of a first embodiment comprising a support pipe 16 and a closure section 22 on a support fitting 28. At its left end, in the drawing the support pipe 16 is widened to form a sleeve 18. At its right end in the drawing, the support pipe 16 is unchanged in diameter and forms a nipple 20 which is configured to connect to a further support pipe 16, or in this case to a closure section 22 that can be pushed into its sleeve 18. On the outside of each nipple 20 and each sleeve 18 attachments 24; 26 are arranged opposite each other in pairs.

After the nipple 20 of a support pipe 16 has been pushed into the sleeve 18 of a further support pipe 16 or a closure section 22 initially offset in the rotary position, the support pipes 16 or the support pipe 16 and the closure section 22 are rotated into rotational engagement. The attachments 24; 26 of the nipple 20 and sleeve 18 thus engage in each other and form an axial positively locking fit. This positively locking fit ensures a precise insertion depth of the nipple 20 into the sleeve 18 and thus prevents both further insertion and pulling apart.

Furthermore, the attachments 26 of the nipple 20 and also the attachments 24 of the sleeve 18 comprise the support pipe fastener and engage with a support fitting fastened to the base of the clarifying basin by means of a tongue and groove connection (FIGS. 4 and 5) comprising an attachment fastener. The groove 30 and tongue 21 extend in the axial direction and engage in the radial direction. This prevents both rotation of the pipe conduit as a whole as well as opposite rotation of the support pipes 16 relative to each other. In the example of embodiment the tongues 32 are on the attachments 24; 26 and the grooves 30 are in lateral faces 34 of the support fittings 28 forming a fastening base. An inverse arrangement is of course also possible and has the same effect.

Figure 3:
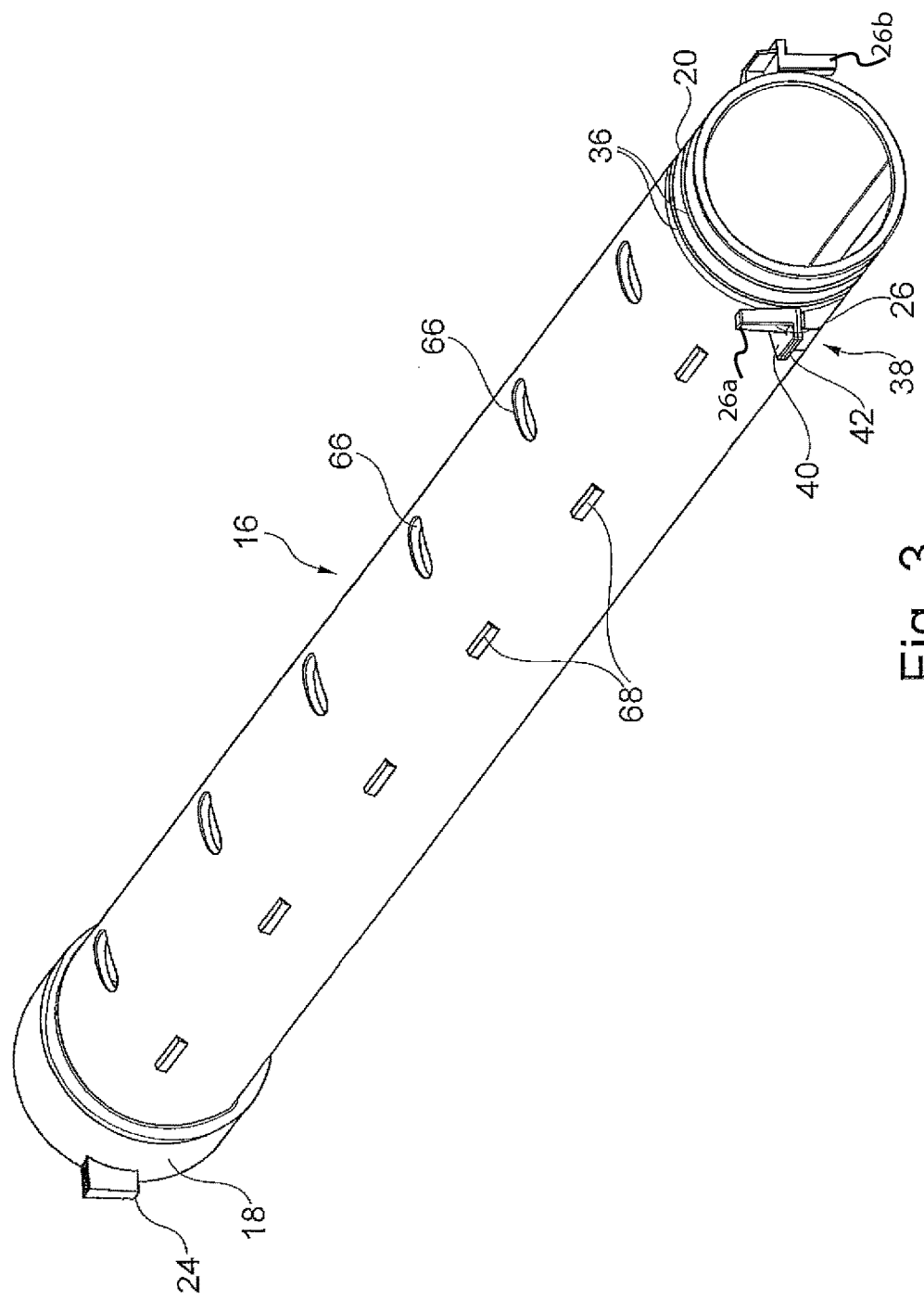
FIG. 3 shows a perspective view of a support pipe in accordance with a first embodiment of a standpipe arrangement.

FIG. 3 shows a perspective view of a support pipe 16 in accordance with a first embodiment of the standpipe arrangement. At its right end in the drawing the nipple 20 can be seen which is not visible in FIG. 2 as it is pushed into the sleeve of the closure section. In diameter the nipple 20 is as large as the middle section of the support pipe 16. The nipple 20 has two circumferential grooves 36 for accommodating sealing rings. The attachments 26 on the nipple are on the axial arm 42 of an L-shaped support 38. A radial arm 40 of the support 38 is fastened on the support pipe 16 in an area adjoining the nipple 20 and its other axial arm 42 extends at a distance from the outer wall of the nipple into the area of the nipple 20. This arm 42 also bears the attachment 26. At the opposite end of the standpipe is the complementary attachment 24.

The orientation of the attachment 26 is such that these attachments are facing in axially opposite directions on opposite sides of the standpipe. For example, the orientation of attachment 26a is axially opposite the orientation of attachment 26b which is disposed on a circumferentially opposite side of the nipple 20. However, the radial orientation of attachments 26a and 26b are the same. In this example of FIG. 3, the attachments 26a and 26b extend radially out first, and then extend in a radially clockwise manner around nipple 20. Likewise, complementary attachments 24, which can be coupled to the opposite end such as to the sleeve 18, can also be oriented in a similar manner. This type of structure and orientation allows for a rotational coupling of these attachments 24 and 26 together when two ends of the standpipes are joined together. This occurs when the sleeve end 18 of one standpipe is coupled to a nipple end 20 of another standpipe. The pipes are then rotated together resulting in the locking of attachment 24 with complementary attachment 26.

The described design allows the sleeve 18 to be pushed up to the transition of the nipple 20 into the middle of the support pipe 16, whereby the sleeve 18 reaches the space between the arm 42 running parallel to the pipe axis of the support pipe 16 and the nipple 20 itself. Only in this way can the attachment 26 on the nipple side engage in the attachments 24 on the sleeve side.

Between the sleeve 18 and the nipple 20 the support pipe 16 has openings 66 which are arranged at a uniform interval and are intended for gas to pass through from the support pipe 16 to the aerator 10 as well as for fastening the aerator 10 to the support pipe 16. The gas openings 66 are oval and are aligned with their longer inner diameters perpendicularly to the longitudinal axis of the support pipe 16. Arranged next to the gas openings 66 on their same axial position in each case are ribs 68 on which aerators 10 mounted on fastening bases 11 are supported. This secures the aerators 10 both against rotation about the longitudinal axis of the support pipe 16 and against rotation perpendicularly to the longitudinal axis of the support pipe 16. Thus, a holder for these aerators 10 can be in the form of any one of gas openings 66 which can be oval in shape, fastening bases 11 and/or ribs 68, wherein fastening bases 11 are coupled to these ribs.

Figure 4:
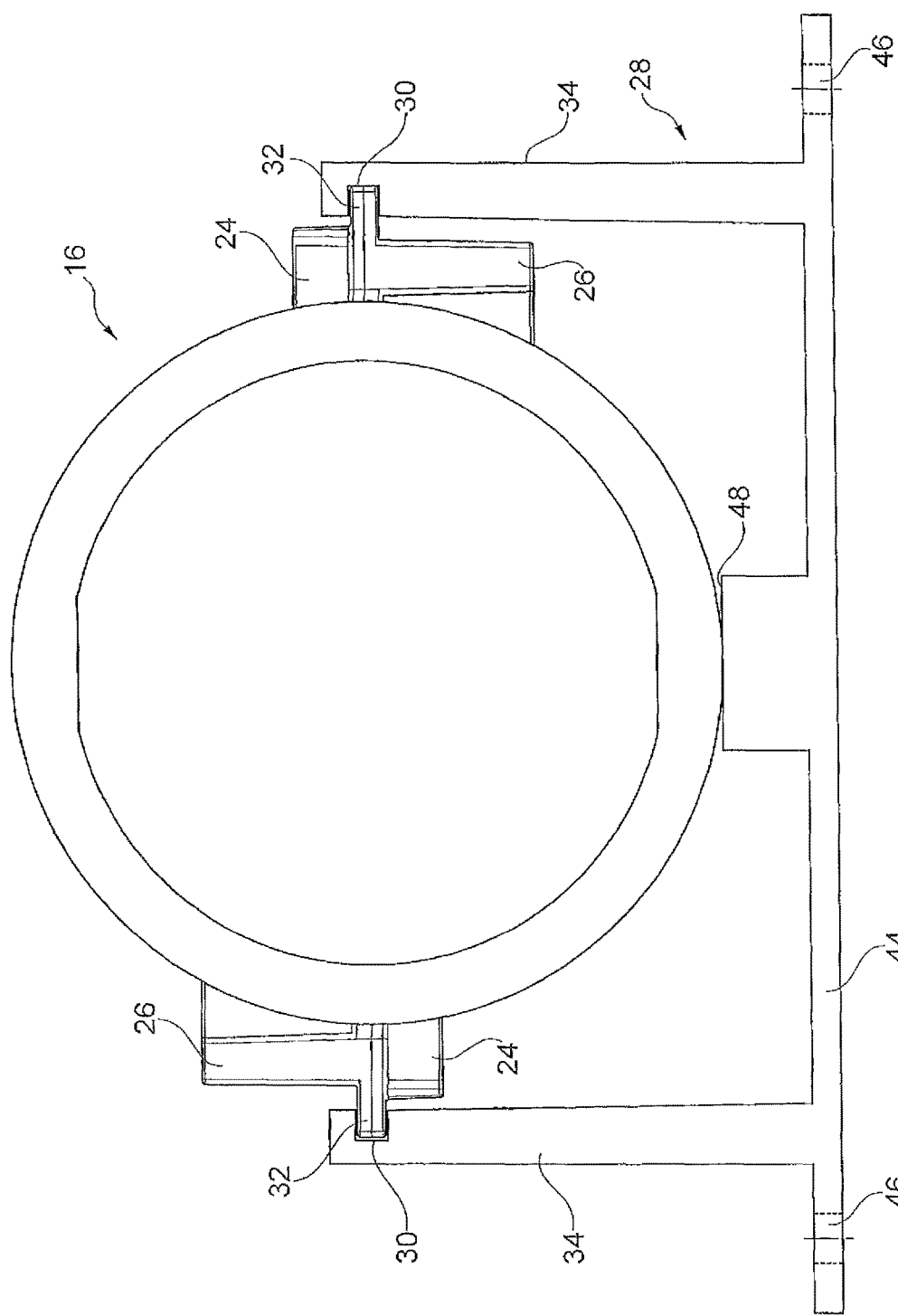
FIG. 4 shows a cross-section through two support pipes inserted into each other in a support fitting in accordance with a first embodiment of the standpipe arrangement.

FIG. 4 shows a cross-section through two support pipes 16 inserted into each other in a support fitting 28 in accordance with a first embodiment of the standpipe arrangement. The support fitting 28 comprises a base plate 44 with drilled holes 46 for fastening to the base of the basin with the aid of threaded bolts, a support surface 48 for the support pipes 16 and two lateral faces 34. These lateral faces 34 have the grooves 30 accommodating tongues 32 arranged on the attachments 24; 26 of the support pipes 16. In the grooves 30 of a support fitting 28 are the tongues 32 both of the sleeve 18 of one support pipe 16 and of the nipple 20 of an adjoining support pipe 16. The attachments 24; 26 are arranged opposite each other in pairs and on a horizontal plane running through the middle axis of the support pipes 16.

Figure 5:
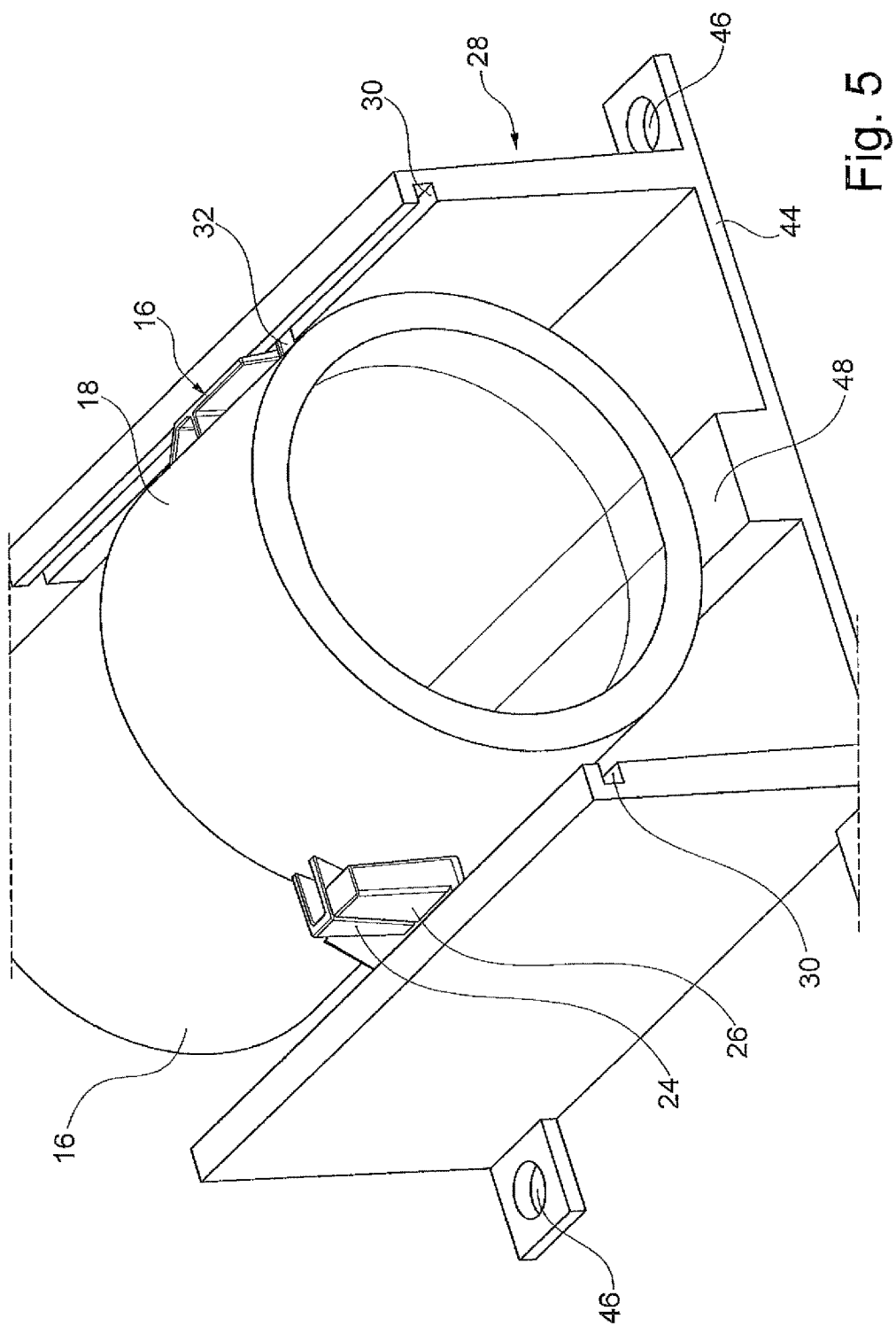
FIG. 5 shows a perspective view of two support pipe sections inserted into each other in a support fitting in accordance with a first embodiment of the standpipe arrangement.

FIG. 5 shows a perspective view of two support pipe sections inserted into each other in a supporting fitting 28 in accordance with a first embodiment of the standpipe arrangement. The components in the drawing are the same as those described in FIG. 4. In this view, support pipe 16 is shown positioned within support fitting 28. As described above, fitting 28 includes a base plate 44, having holes 46, and a support surface 48. A groove 30 is shown receiving a tongue in a perspective orientation. In this view, attachments 24 and 26 are shown positioned adjacent to each other while sleeve 18 is coupled around support pipe 16.

FIG. 6 shows an exploded view of a standpipe arrangement in accordance with a second embodiment comprising a support pipe 12 and two pipe connectors 14 at each end. At its ends the support pipe 12 has external threads 50, 52 which are screwed to the inner threads 54; 56 of the pipe connectors 14. The threads 50, 52, 54, 56 run contrary to each other, i.e. on a support pipe 12 one thread is a right-handed thread 50 and the other thread a left-handed thread 52. The same applies to the pipe connectors 14. A sealing ring 58 is arranged between a support pipe 12 and a pipe connector 14. The pipe conduit is connected to the central gas supply with a connection pipe 60 which has no aerators. At the other, i.e. the outer end of the pipe conduit a closure section 62 is arranged instead of a support pipe. In the exploded view the fastening bolts 64 are shown.

FIGS. 7A and 7B show various views, offset by 90 degrees with regard to each other, of an assembled standpipe arrangement in accordance with a second embodiment. For example, FIG. 7a shows a longitudinal view from the side, FIG. 7b shows a longitudinal view from above, and FIG. 7c shows a transverse view. Between the threads 50, 52 the support pipe has openings 66 which are arranged at uniform intervals and are intended both for gas to flow through from the support pipe 12 to the aerator 10, as well as for fastening the aerator 10 to the support pipe 12. These views also show pipe connectors 14 as well.

Figure 8:
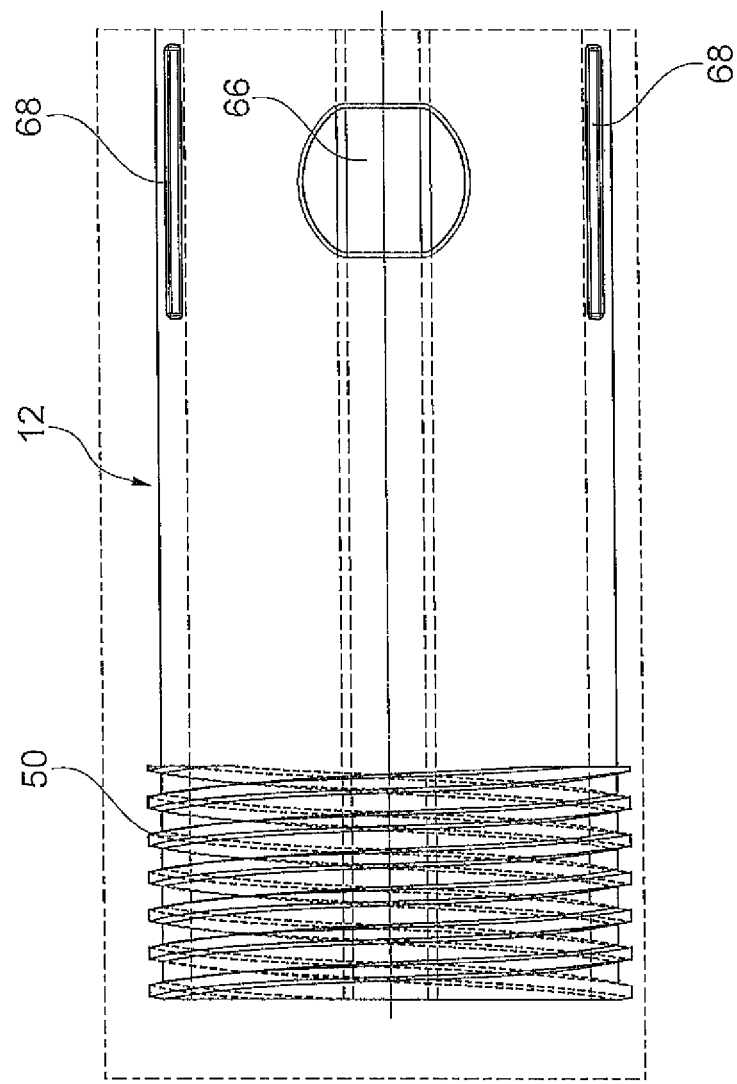
FIG. 8 shows a partial view of a support pipe in accordance with a second embodiment of the standpipe arrangement.

FIG. 8 shows a partial view of a support pipe 12 to clarify the design of a gas opening 66. This is oval in shape and aligned with its longer inner diameter perpendicularly to the longitudinal axis of the support pipe 12. Arranged next to the gas openings 66 on their same axial position in each case are ribs 68 on which aerators 10 mounted on fastening bases are supported. This secures the aerators 10 both against rotation about the longitudinal axis of the support pipe 12 and against rotation perpendicularly to the longitudinal axis of the support pipe 16. At one end of this support pipe are threads 50 as well.

FIGS. 9A, 9B, and 9C show various views, offset about 90 degrees with regard to each other, of a pipe connector 14. For example, FIG. 9a shows a transverse view, FIG. 9b shows a view from above and FIG. 9c shows a section through 9b. The pipe connectors 14 have two internal threads 54, 56 which run contrary to one another. In addition, lateral attachments 70 are present which have elongated holes 72. The height of the attachments 70 is half the outer diameter of the pipe connectors 14. The attachments 70 extend from a horizontal tangent on the pipe connector 14 to half the height of the pipe connector 14. In the assembled stated the fastening blots screwed into the base of the basin pass through the elongated holes 72. The pipe connector 14 is not firmly pressed against the base of the basin by the head or a nut of the fastening bolt 64, but a space is retained which allows an axial movement of the pipe connector 14. The pipe conduit is thus supported in floating manner.

FIG. 10a, and FIG. 10b shows a perspective view of a pipe connector, namely FIG. 10a shows a perspective view and FIG. 10b a view from below.

In practice all the components are numbered and are different in colour so that rapid assembly is ensured and incorrect use can be prevented. This is of advantage, particularly in relation to the longitudinal expansion, as assembly errors when using conventional connection and fastening components lead to damage to the entire air supply system.

Through the use of the pipe connector in combination with prefabricated ballasts, the entire structure can be lifted. This means that the pipeline construction together with assembled aerators can be lifted from the basin for maintenance purposes even when the basin is full. When using conventional connectors, lifting of a plastic pipeline system is not possible due to the predetermined pipeline design. The pipes would break on lifting as the connectors cannot absorb the forces.

| List of references |
| --- |
| 10 Aerator |
| 12 Support pipe |
| 14 Pipe connector |
| 16 Support pipe |
| 18 Sleeve |
| 20 Nipple |
| 22 Closure section |
| 24 Attachment |
| 28 Support fitting |
| 30 Groove |
| 32 Tongue |
| 34 Face |
| 36 Circumferential groove |
| 38 L-shaped support |
| 40 Radial arm |
| 42 Axial arm |
| 44 Base plate |
| 46 Drilled hole |
| 48 Support surface |
| 50 External thread |

List of references

| | |
|---|---|
| 52 | External thread |
| 54 | Internal thread |
| 56 | Internal thread |
| 58 | Sealing ring |
| 60 | Connection pipe |
| 62 | Closure section |
| 66 | Openings |
| 68 | Ribs |
| 70 | Attachments |
| 72 | Elongated holes |

The invention claimed is:

1. A standpipe arrangement for holding and for supplying gas from aerators in a clarifying basin, comprising:
 a pipe conduit comprising:
 a plurality of support pipes having openings;
 at least one support pipe fastener for fastening at least two of said plurality of support pipes together along a pipe axis wherein said at least one support pipe fastener has a nipple at one end and a sleeve at another end;
 a plurality of aerators with at least one aerator in communication with at least one of said openings;
 a holder configured to couple said plurality of aerators to said pipe conduit; and
 a fastener for fastening said pipe conduit to the clarifying basin;
 wherein said at least one support pipe fastener is configured to fix said plurality of support pipes both at a distance over the base of the clarifying basin, and also laterally as well as against rotation about the pipe axis, wherein said at least one support pipe fastener is moveable along the pipe axis;
 at least one base plate having a lower support surface and lateral sides wherein said plurality of support pipes are coupled to said base plate and wherein said base plate is configured to space said plurality of support pipes at a distance from said lower support surface, wherein said at least one base plate is configured to provide a torsional safety of the plurality of support pipes among each other and laterally, and additionally allow said plurality of support pipes to be slidable in an axial direction;
 wherein said of at least one support pipe fastener engages in a sleeve of an adjacent support pipe of said plurality of support pipes, wherein said at least one support pipe fastener has attachments arranged opposite each other in pairs, and wherein said attachments fix said support pipe axially;
 wherein said attachments are configured to engage each other after rotating to form an axial positively locking fit between adjacent support pipes of said plurality of support pipes, and wherein the standpipe arrangement further comprises an attachment fastener and a support fitting, said attachment fastener configured to fasten said attachments to said support fitting and wherein said attachments provide lateral fixation relative to the support fitting and allow axial displacement relative to said support fitting.

2. The standpipe arrangement as in claim 1, wherein said attachment fastener comprises a tongue and a groove forming a connection with said support fitting, wherein said support fitting has lateral faces fastened to the base of the clarifying basin and wherein the tongue and groove extend in an axial direction and engage in a radial direction.

3. The standpipe arrangement according to claim 2, wherein said attachments are arranged opposite each other in pairs and lie on a horizontal plane extending through the middle axis of said plurality of support pipes and wherein said support fitting partially surrounds the support pipes in the area of the nipple and sleeve at the bottom and at the sides, and ends in a set of faces laterally above said attachment fastener.

4. The standpipe arrangement according to claim 2, wherein said attachment fastener comprise either grooves on an attachment side and tongues on a face side or tongues on the attachment side and grooves on the face side.

5. The standpipe arrangement according to claim 1, wherein said support fitting has a plurality of lateral attachments that are configured to be fastened to the pipe conduit on the base of the clarifying basin and wherein the standpipe arrangement further comprises bolts;
 wherein said plurality of lateral attachments each have at least one axially extending elongated hole though which in an assembled condition, at least one fastening bolt of said fastening bolts is anchored in the base of the clarifying basis pass, wherein said fastening bolt has stops, at least above the attachments on the pipe connector and at a small distance from the top of the attachments, such that the pipe connectors can be axially moved relative to said plurality of fastening bolts even in the assembled condition.

6. The standpipe arrangement according to claim 5, further comprising spacer sleeves arranged on the fastening bolts which are slightly longer than the height of the attachments on the pipe connector.

7. The standpipe arrangement according to claim 6, wherein a height of said support fitting is around half the outer diameter of the pipe connector.

8. The standpipe arrangement according to claim 5, wherein in the assembled condition, the attachments extend from a lower horizontal tangent on the pipe connectors to half the height of the pipe connectors.

9. The standpipe arrangement as in claim 1, wherein at least one support pipe of said plurality of support pipes and at least one pipe connector have opposite threads on each of their ends.

10. The standpipe arrangement according to claim 1, wherein said holder comprises openings to said aerators are arranged in the support pipes of the pipe conduit, and wherein said openings are oval in design, and are arranged with their longer inner diameters perpendicular to the longitudinal axis of the support pipes and thus secure the aerators against rotating perpendicularly to the longitudinal axis of the support pipes.

11. The standpipe arrangement according to claim 10, wherein through material accumulation, wall areas of the support pipes adjoining gas openings are thicker than the other wall areas.

12. The standpipe arrangement according to claim 10, further comprising ribs disposed on both sides of at least one of said plurality of support pipes, next to the gas openings on the same axial position, wherein said ribs are configured to support fastening bases of assembled aerators, and which thus secure the aerators against rotating about the longitudinal axis of the support pipes.

13. The standpipe arrangement as in claim 1, wherein said holder comprises a fastening base.

14. The standpipe arrangement as in claim 1, wherein said holder comprises at least one rib coupled to at least one of said support pipes.

15. The standpipe arrangement as in claim 1, wherein said holder is at least one opening of said openings formed in an oval shape.

16. The standpipe arrangement as in claim 1, further comprising at least one rib coupled to at least one support pipe, and at least one fastening base coupled to at least one of said plurality of aerators, wherein said holder is formed from said at least one fastening base coupled to said at least one rib.

* * * * *